June 17, 1969 W. R. BROWN 3,449,954
RING-TYPE FLOW METER

Filed May 23, 1967 Sheet 1 of 2

INVENTOR
WILLIAM R. BROWN
BY Robert M. Dunning
ATTORNEY

United States Patent Office 3,449,954
Patented June 17, 1969

3,449,954
RING-TYPE FLOW METER
William R. Brown, St. Paul, Minn., assignor, by mesne assignments, to Control Data Corporation, Minneapolis, Minn., a corporation of Delaware
Filed May 23, 1967, Ser. No. 640,712
Int. Cl. G01f 1/04
U.S. Cl. 73—212                    5 Claims

ABSTRACT OF THE DISCLOSURE

The invention describes a ring-type flow meter adapted to be inserted into a pipeline to measure flow therethrough. One or more differential pressure generating forms are provided. These forms are substantially trapezoidal in outline, having parallel front and rear surfaces substantially on planes normal to the axis of the pipeline, and inclined ramp forming sides which incline inwardly toward the center of the pipeline and downstream. Piezometer passages communicate with the relatively small upstream surface and relatively larger downstream side. If desired, alternately facing ramps may be provided to create differential pressure regardless of the direction of flow.

Summary of the invention

This invention relates to an improvement in ring-type flow meters and deals particularly with a means of measuring the flow of fluid through a pipe or similar conduit.

In my previous application for Flow Meter, Ser. No. 630,855, filed Apr. 14, 1967, I disclosed a flow meter of a type which produced a very small fluid flow. The structure disclosed was tested and found that an 8 inch diameter meter created a net or actual loss of from 0 percent to only 1½ percent over a flow range of approximately 0 flow to approximately 1,000,000 pipe Reynolds number. This is far below the true value of other devices which are presently known. For example, this percentage can be compared with approximately 12 to 16 percent loss for a long form venture, or to an approximate loss of 5 percent for a compact tube. An Orifice plate would produce an approximate 70 percent loss. These losses are stated as a percentage of inflated differentials.

In the forms of construction illustrated in this patent, a ring having an inner diameter substantially similar to that of a pipe or conduit was anchored between a pair of pipe sections, and a series of angularly spaced wedges or ramps were supported on the ring. These ramps or wedges were substantially right triangular in shape, the hypotenuse of the triangle forming the leading edge of each ramp, and the adjoining right angular side of the triangle forming the trailing edge. In order to measure flow in both directions, the wedges or ramps were alternated in position, one-half of the ramp being positioned so that the trailing edge faced in one direction, and the remaining half of the ramps were arranged with their trailing edges facing in the opposite direction. Piezometer openings were formed through the ramps communicating with the trailing edge thereof. These pressure openings were subject to negative pressures or readings when the openings were on the downstream side of the ramps. The sides of the ramp which faced upstream on the alternate ramps would be subject to dynamic pressure.

The previous structure has been found extremely effective for its intended purpose. I have found, however, that in some instances it may be desirable to provide the dynamic pressure openings and the negative pressure readings directly upstream or downstream from each other. The present invention is designed to disclose a modified form of wedge or ramp in which both a dynamic pressure passage and a negative pressure passage are incorporated, one passage being directly downstream from the other. This is accomplished in preferred form by cutting off the tip of the hypotenuse of the wedge which is designed to face upstream, and providing a dynamic pressure opening in this vertical side of the ramp. The negative pressure opening is in the opposite side or in the trailing edge of the ramp where it is subject to relatively low pressures.

A feature of the present invention resides in the provision of a flow meter provided with a series of angularly spaced wedges or ramps which are of trapezoidal outline. The two parallel sides of the trapezoid form portions of the leading edge and the trailing edge of the ramps, and the ramps are arranged with a leading or upstream surface which inclines rearwardly and inwardly toward the center of the ring. In other words, the trapezoidal ramps are similar to the triangular ramps shown in the previous application with the exception of the fact that the upstream tip of the triangular is cut off along a plane parallel to the rear or trailing edge of the ramp, and piezometer openings communicate with each of the parallel upstream and downstream surfaces of each ramp.

An object of the present invention resides in a provision of a flow meter of the type described in which the ramps may be alternately arranged so that the upstream sides of alternate ramps face in one direction, and the remaining ramps face in the other. Thus the device is capable of measuring flow in either direction when it is so desired.

These and other objects and novel features of the present invention will be more clearly and fully set forth in the following specification and claims.

Description of the invention

Figure 1:
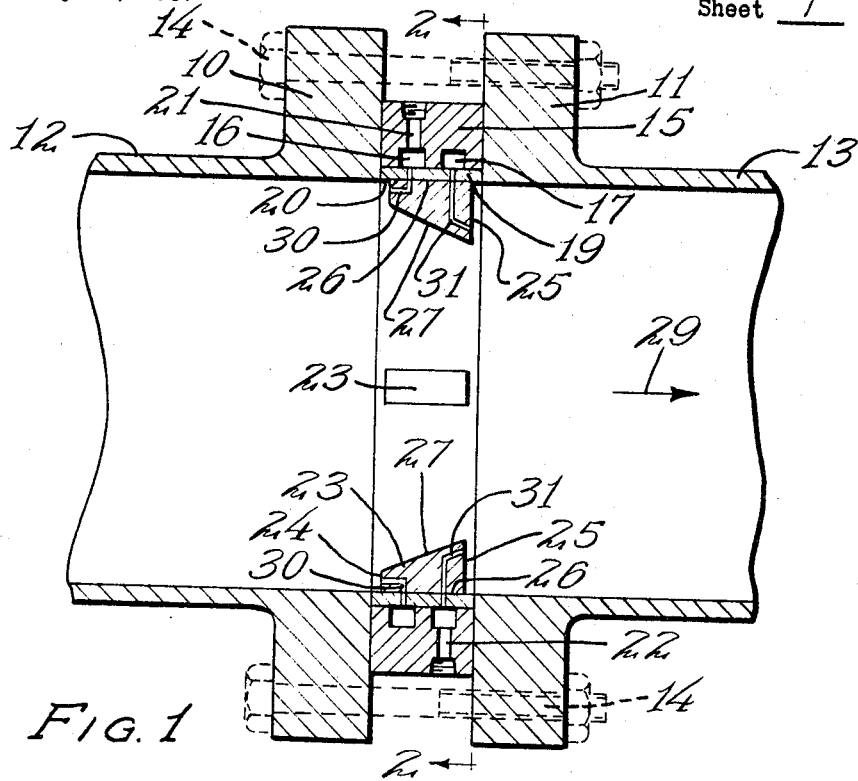
FIGURE 1 is a vertical cross-sectional view through a ring meter showing the general arrangement of parts.
Figure 2:
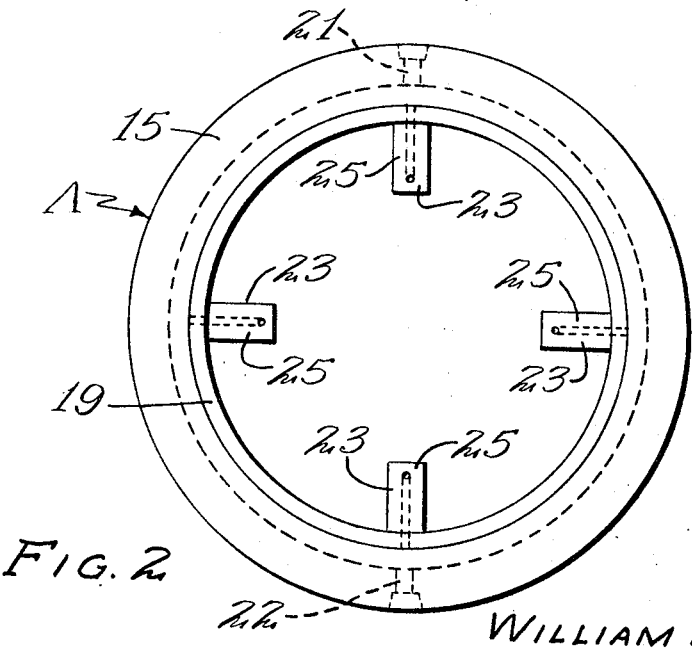
FIGURE 2 is a cross-sectional view through the pipe adjoining the meter, the position of the section being indicated by the line 2—2 of FIGURE 1.

The flow meter is indicated in general by the letter A, and is preferably supported between the flanged ends 10 and 11 of a pair of pipe sections 12 and 13. The meter A may be held in place by means of angularly spaced clamping bolts 14 which clamps the flanges 10 and 11 together.

The flow meter A includes a ring 15 of rectangular cross-section having a pair of axially spaced grooves 16 and 17 in its inner surface. The inner side of the grooves 16 and 17 is normally closed by a ring 19, the inner surface 20 of which is similar in diameter to the inner surfaces of the pipe sections 12 and 13. Radially extending passages 21 and 22 communicate with the interior of the grooves 16 and 17 respectively, these passages comprising piezometer passages by means of which the grooves are connected to a piezometer, not illustrated in the drawings, by means of which the differential pressure in the two grooves may be measured.

In the flow meter A, a series of four equally spaced ramps or wedges 23 are provided. These wedges 23 are trapezoidal in outline having a relatively short forward surface 24 on a plane normal to the axis of the pipes, and a parallel downstream surface 25 which is also normal to the axis of the pipe sections. The base side 26 is mounted upon the inner surface of the ring 19. The outer surface 27 of each ramp is at an acute angle to the outer side 26, and inclines toward the center of the pipe sections and inclines rearwardly or downstream so that the inclined outer surface 27 is subject to pressure when the fluid is moving in the direction of the arrow 29 in FIG. 1.

As is evident from FIGURE 1 of the drawings, a generally L-shaped passageway 30 is provided communicating with the upstream side 24 of each ramp, and communicating with the interior of the groove 16. A second generally L-shaped passage 31 is provided in each ramp, the rear end of each pasage 31 communicating with the downstream side 25 of the ramp, and the other end of each passage communicating with the groove 17. Thus the pressure which exists in the groove 16 is a dynamic relatively high pressure while the pressure in the groove 17 is a relatively low or negative pressure caused by the flow of fluid past the trailing edge of the ramp.

Figure 3:
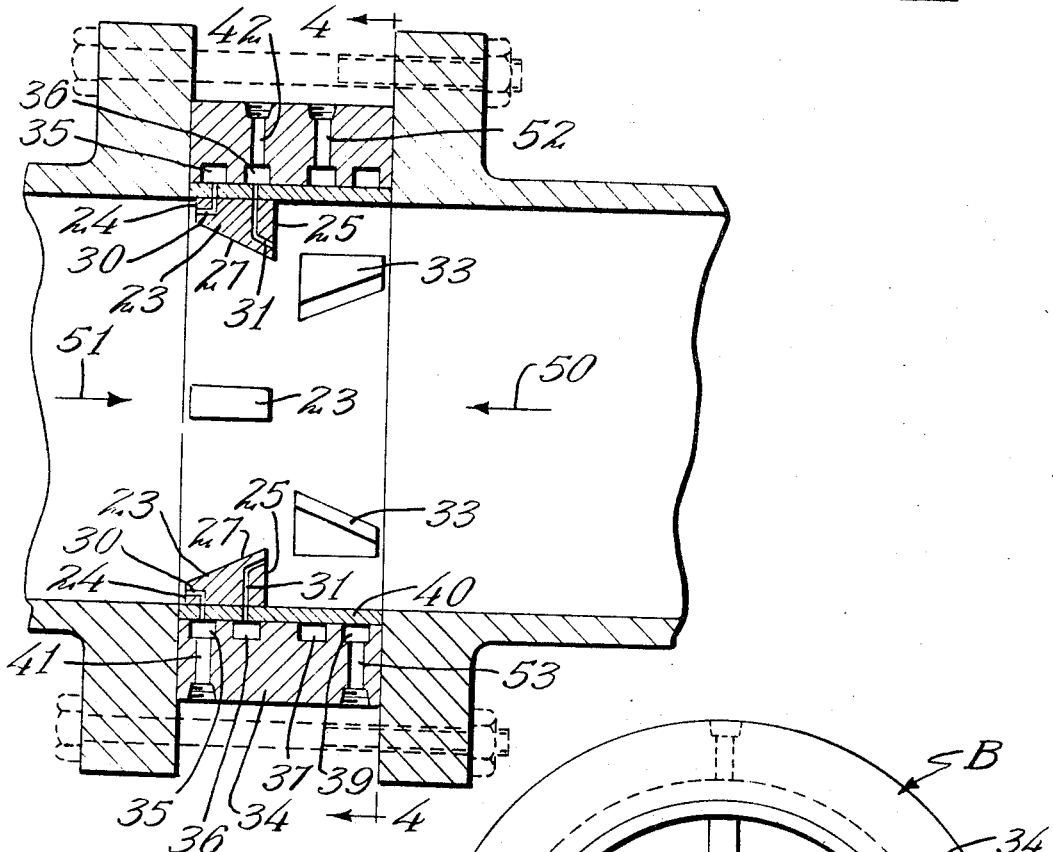
FIGURE 3 is a view similar to FIGURE 1, showing a modified form of construction.
Figure 4:
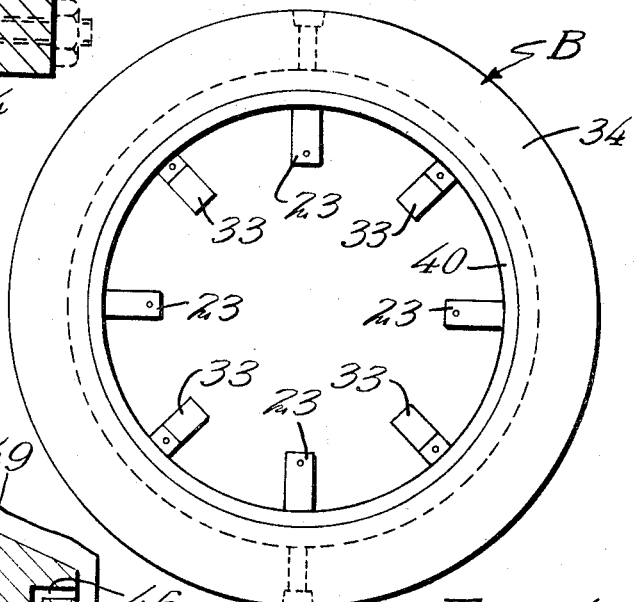
FIGURE 4 is a sectional view through the conduit adjoining the meter, the position of the section being indicated by the line 4—4 of FIGURE 3.
Figure 5:
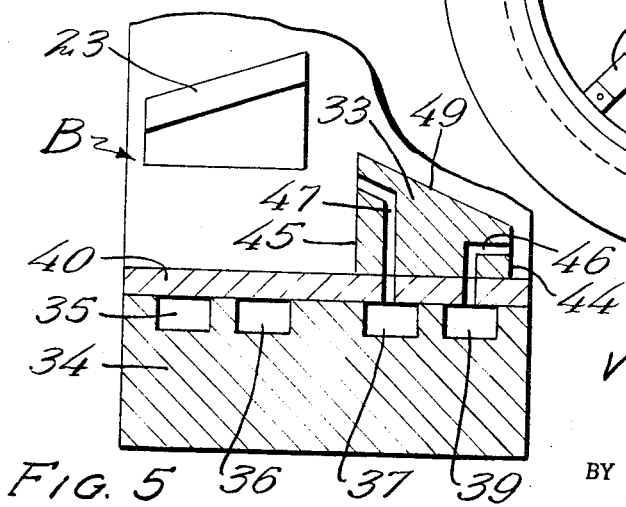
FIGURE 5 is an enlarged sectional detail through one of the ramps or wedges, showing an arrangement of passages therein.

FIGURES 3, 4 and 5 of the drawings show a slightly modified form of construction which is indicated in general by the letter B. The flow meter B is similar to the flow meter A except for the fact that the flow meter B is provided with twice as many ramps as the meter A, and alternate ramps face in opposite direction so that a flow measurement can be provided regardless of direction of flow of fluid through the pipe sections. In view of the fact that alternate ramps 23 are identical to those previously described, they have been given the same identifying numerals in FIGURES 3 to 5. However, the flow meter B is provided with intermediate ramps 33 which are identical to the ramps 23 but are reversed in direction.

As indicated in FIGURES 3 to 5 of the drawings, the flow meter B includes a ring 34 having a series of four axially spaced grooves therein, these grooves being indicated at 35, 36, 37 and 39. A sealing ring 40 lies inwardly of the ring 34 to close the inner surfaces of the grooves. As indicated in FIGURE 3 of the drawings, the generally L-shaped dynamic pressure passages 30 communicate with the groove 35, and the generally L-shaped low or negative pressure passages 31 communicate with the interior of the groove 36. Passages 41 and 42 for providing piezometer connections extend through the ring 34 for suitable connections with the piezometer tubes.

The rings 34 and 40 of the flow meter B are substantially twice as wide as the corresponding rings of the flow meter A. Mounted upon the ring 40 intermediate the ramps 23, the opposite ramps 33 are located. In the arrangement illustrated there are four ramps 23 and four ramps 33, so that the angular distance between the ramps 23 and 33 is 45 degrees.

As is indicated in FIGURE 5 of the drawings, the ramps 33 are trapezoidal in shape, including a relatively short surface 44 which faces the left as viewed in the drawings, and parallel relatively large face 45 which faces the left as viewed in this figure. The right facing sides 44 are provided with generally L-shaped dynamic pressure passages 46 which continue through the ring 40 to communicate with the groove 39. The relatively large face 45 includes a generally L-shaped passage 47 which continues through the ring 40 into communication with the groove 37. The faces 44 and 45 are preferably on planes which are normal to the axis of the ring 40, while the inner face 49 of each ramp is at an acute angle to the adjoining portion of the surface of the ring.

The ramps 33 are designed to provide a measurement of pressure differential when the flow of fluid is to the left, or in the direction of the arrow 50 in FIGURE 3 of the drawings. The ramps 23 are designed to provide a measure of pressure differential when the flow of fluid is to the right, or in the direction of the arrow 51 in FIGURE 3 of the drawings.

In the arrangement illustrated, the ramps are of a uniform thickness and extend radially inwardly from the surface of the ring 40. If desired, the ramps could be partially frusto-conical in shape. The ramps are of sufficient height to penetrate the boundary layer of fluid flowing through the pipe. It is possible to use a single ramp to measure the flow in either direction, but it is usually preferable to provide a series of angularly spaced ramps and to provide an average reading therebetween.

The grooves 37 and 39 are provided with piezometer passages 52 and 53 which are designed for connection with piezometer tubes to provide a reading of the pressure differential.

In accordance with the Patent Office statutes, I have described the principles of construction and operation of Ring-Type Flow Meter, and while I have endeavored to set forth the best embodiment thereof, I desire to have it understood that changes may be made within the scope of the accompanying claims without departing from the spirit of my invention.

I claim:

1. A ring-type flow meter adapted to be inserted in a pipeline and including:
   a ring body,
   a pressure generator form mounted on said ring to extend through the boundary layer thereof,
   said form being of generally trapezoidal outline and providing a relatively small upstream side, a relatively larger downstream side substantially parallel to said upstream side, and a ramp side which is inclined inwardly and downstream to be subject to a part of the pressure of fluid flowing downstream, a piezometer passage communicating with the upstream side of said form,
   said form having parallel opposite sides which are in right angular relation to said previously mentioned sides and parallel to the axis of said ring body.

2. A ring-type flow meter adapted to be inserted in a pipeline and including:
   a ring body,
   a pressure generator form mounted on said ring to extend through the boundary layer thereof,
   said form being of generally trapezoidal outline and providing a relatively small upstream side, a relatively larger downstream side substantially parallel to said upstream side, and a ramp side which is inclined inwardly and downstream to be subject to a part of the pressure of fluid flowing downstream, a piezometer passage communicating with the upstream side of said form,
   a second piezometer passage communicating with the downstream side of said form,
   said form being narrow in width relative to the inner circumference of said ring body, and including a second pressure generating form facing in the opposite direction from the first form so that said larger side thereof is upstream from the smaller side thereof, said second form being spaced angularly about the circumference of said ring from said first form.

3. A ring-type flow meter adapted to be inserted in a pipeline and including:
   a ring body,
   a pressure generator form mounted on said ring to extend through the boundary layer thereof,
   said form being of generally trapezoidal outline and providing a relatively small upstream side, a relatively larger downstream side substantially parallel to said upstream side, and a ramp side which is inclined inwardly and downstream to be subject to a part of the pressure of fluid flowing downstream, a piezometer passage communicating with the upstream side of said form, a second piezometer passage communicating with the downstream side of said form, said form being narrow in width relative to the inner circumference of said ring body and including a plurality of similar forms in angularly spaced relation about the inner circumference of said ring body.

4. The structure of claim 3 and in which alternate of said forms face in a direction opposite the remainder with the larger and smaller sides reversed in position.

5. The structure of claim 1 and including a plurality of similar forms angularly spaced about the inner circumference of said ring body.

References Cited

UNITED STATES PATENTS

| | | | |
|---|---|---|---|
| 2,044,806 | 6/1936 | Naiman | 73—211 X |
| 2,260,019 | 10/1941 | Gentile | 73—212 |
| 2,605,639 | 8/1952 | Gentile | 73—272 |
| 2,614,423 | 10/1952 | Carbone | 73—211 |
| 3,355,946 | 12/1967 | Lazell | 73—212 |

RICHARD C. QUEISSER, *Primary Examiner.*

EDWARD D. GILHOOLY, *Assistant Examiner.*

U.S. Cl. X.R.

73—211